(12) United States Patent
Duan et al.

(10) Patent No.: US 9,681,074 B2
(45) Date of Patent: Jun. 13, 2017

(54) PIXEL CIRCUIT INCLUDING COMPENSATION UNIT, DRIVING METHOD THEREOF AND DETECTOR

(71) Applicant: BOE TECHNOLOGY GROUP CO., LTD., Beijing (CN)

(72) Inventors: Liye Duan, Beijing (CN); Chung-Chun Lee, Beijing (CN); Feng Jiang, Beijing (CN); Li Zhou, Beijing (CN); Long Wang, Beijing (CN); Chieh Hsing Chung, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/103,979

(22) PCT Filed: Oct. 20, 2015

(86) PCT No.: PCT/CN2015/092282
§ 371 (c)(1),
(2) Date: Jun. 13, 2016

(87) PCT Pub. No.: WO2016/197508
PCT Pub. Date: Dec. 15, 2016

(65) Prior Publication Data
US 2017/0126994 A1   May 4, 2017

(30) Foreign Application Priority Data
Jun. 12, 2015   (CN) .......................... 2015 1 0324511

(51) Int. Cl.
H04N 5/235   (2006.01)
H04N 5/357   (2011.01)
(Continued)

(52) U.S. Cl.
CPC ............. *H04N 5/357* (2013.01); *G01T 1/247* (2013.01); *H04N 5/37457* (2013.01); *H04N 5/66* (2013.01); *H04N 5/32* (2013.01)

(58) Field of Classification Search
CPC .. H04N 5/23296; H04N 5/236; H04N 5/2351; G02B 7/102
See application file for complete search history.

(56) References Cited

U.S. PATENT DOCUMENTS 5,369,268 A    11/1994  Van Aller et al.
2004/0218077 A1  11/2004  Petrick et al.
(Continued)

FOREIGN PATENT DOCUMENTS

CN   101464579 A    6/2009
CN   103325343 A    9/2013
(Continued)

OTHER PUBLICATIONS

English Translation of China Office Action, Application No. 2015103245113, dated Jan. 25, 2017, 14 pps.
(Continued)

*Primary Examiner* — Tuan Ho
(74) *Attorney, Agent, or Firm* — Armstrong Teasdale LLP (57) ABSTRACT

A pixel circuit is provided. The pixel circuit includes a photoelectric converter unit, an amplifier unit, a reset unit, a compensation unit, a charging unit, and a readout unit, wherein the photoelectric converter unit is connected to a first voltage terminal and the amplifier unit, and is configured to convert an optical signal into an electric signal, wherein the amplifier unit is connected to the photoelectric converter unit, the charging unit, and the readout unit, and is configured to amplify an output signal from the photoelectric converter unit, and wherein the reset unit is connected to a reset terminal, the first voltage terminal, and the amplifier (Continued)

unit, and is configured to reset the amplifier unit based on an input signal from the reset terminal and an input signal from the first voltage terminal.

20 Claims, 4 Drawing Sheets

(51) Int. Cl.
    *G01T 1/24*     (2006.01)
    *H04N 5/66*     (2006.01)
    *H04N 5/3745*     (2011.01)
    *H04N 5/32*     (2006.01)

(56) References Cited

U.S. PATENT DOCUMENTS

| | | | |
|---|---|---|---|
| 2010/0140455 A1* | 6/2010 | Nathan | G01D 5/24 250/214 A |
| 2010/0308345 A1* | 12/2010 | Brown | G02F 1/13318 257/82 |
| 2011/0128428 A1 | 6/2011 | Takatoku et al. | |
| 2014/0291670 A1 | 10/2014 | Yamada et al. | |
| 2016/0165160 A1* | 6/2016 | Hseih et al. | H04N 5/363 348/308 |

FOREIGN PATENT DOCUMENTS

| | | |
|---|---|---|
| CN | 103354079 A | 10/2013 |
| CN | 104064149 A | 9/2014 |
| CN | 104091559 A | 10/2014 |
| CN | 104867431 A | 8/2015 |
| JP | 2014170092 A | 9/2014 |

OTHER PUBLICATIONS

China Office Action, Application No. 201510324511.3, dated Jan. 25, 2017, 10 pps.

English Translation of China PCT Written Opinion, Application No. PCT/CN20151092282, dated Mar. 11, 2016, 6 pps.

\* cited by examiner

PIXEL CIRCUIT INCLUDING COMPENSATION UNIT, DRIVING METHOD THEREOF AND DETECTOR

CROSS REFERENCE TO RELATED APPLICATIONS

The present application is a National Stage Entry of PCT/CN2015/092282 filed Oct. 20, 2015, which claims the benefit and priority of Chinese patent application No. 201510324511.3 filed on Jun. 12, 2015, both of which are incorporated herein by reference in their entirety.

BACKGROUND

The present disclosure relates to display technology, and more particularly, to a pixel circuit, a drive method thereof and a detector comprising such a pixel circuit.

X-ray flat panel detector is an X-ray image detector based on an array of photoelectric diodes. The scintillator or fluorophor layer of the detector may convert X-ray photons into visible light under irradiation of X-ray. Thereafter, the visible light may be converted into an image electric signal by an array having function of a photoelectric diode. The image electric signal is read out through a peripheral circuit, and is analog/digital converted to obtain a digitalized image.

By adding an amplifier transistor in a pixel circuit, electric charges accumulated by the photoelectric diode may be converted into a voltage and amplified so as to increase signal to noise ratio of the image signal significantly and thus increase a capability of interference suppression in the transmission of the image signal. However, there is no compensation for a threshold voltage Vth of the amplifier transistor in the existing pixel circuit, and therefore the image quality would be decreased.

BRIEF DESCRIPTION

Embodiments of the present disclosure provide a pixel circuit, a driving method thereof and a detector to compensate for the threshold voltage Vth of the amplifier transistor in the pixel circuit, so as to increase the image quality.

According to an aspect of the present disclosure, there is provided a pixel circuit, which includes a photoelectric converter unit, an amplifier unit, a reset unit, a compensation unit, a charging unit and a readout unit. The photoelectric converter unit is connected to a first voltage terminal and the amplifier unit, and is configured to convert an optical signal into an electric signal. The amplifier unit is connected to the photoelectric converter unit, the charging unit and the readout unit, and is configured to amplify an output signal from the photoelectric converter unit. The reset unit is connected to a reset terminal, the first voltage terminal and the amplifier unit, and is configured to reset the amplifier unit according to an input signal from the reset terminal and an input signal from the first voltage terminal. The charging unit is connected to a first control terminal, a second voltage terminal and the amplifier unit, and is configured to control a voltage at an end of the amplifier unit according to an input signal from the first control terminal and an input signal from the second voltage terminal. The compensation unit is connected to a second control terminal, the reset unit and the amplifier unit, and is configured to control a voltage at another end of the amplifier unit according to an input signal from the second control terminal. The readout unit is connected to a third control terminal and the amplifier unit, and is configured to control an output signal according to an input signal from the third control terminal.

In an embodiment of the present disclosure, the photoelectric converter unit may include a photoelectric diode. The photoelectric diode may be connected between the amplifier unit and the first voltage terminal.

In an embodiment of the present disclosure, the amplifier unit may include an amplifier transistor. A gate electrode of the amplifier transistor is connected to the photoelectric converter unit, a first electrode of the amplifier transistor is connected to the charging unit, and a second electrode of the amplifier transistor is connected to the readout unit.

In an embodiment of the present disclosure, the reset unit may include a first transistor. A gate electrode of the first transistor is connected to the reset terminal, a first electrode of the first transistor is connected to the amplifier unit, and a second electrode of the first transistor is connected to the first voltage terminal.

In an embodiment of the present disclosure, the charging unit may include a third transistor. A gate electrode of the third transistor is connected to the first control terminal, a first electrode of the third transistor is connected to the second voltage terminal, and a second electrode of the third transistor is connected to the amplifier unit.

In an embodiment of the present disclosure, the compensation unit may include a second transistor. A gate electrode of the second transistor is connected to the second control terminal, a first electrode of the second transistor is connected to the reset unit, and a second electrode of the second transistor is connected to the amplifier unit.

In an embodiment of the present disclosure, the readout unit may include a fourth transistor. A gate electrode of the fourth transistor is connected to the third control terminal, a first electrode of the fourth transistor is connected to the amplifier unit, and a second electrode of the fourth transistor outputs the output signal.

In an embodiment of the present disclosure, the pixel circuit may further include a first capacitor. The first capacitor may be connected between the second voltage terminal and an input of the amplifier unit. Alternatively, the first capacitor may be connected between the first voltage terminal and an input of the amplifier unit.

In an embodiment of the present disclosure, the pixel circuit may further include a first capacitor and a second capacitor. The first capacitor is connected between the second voltage terminal and an input of the amplifier unit, and the second capacitor is connected between the first voltage terminal and an input of the amplifier unit.

In an embodiment of the present disclosure, all the transistors are P-type transistors.

In an embodiment of the present disclosure, all the transistors are N-type transistors.

According to another aspect of the present disclosure, there is provided a detector which includes the pixel circuit as described above.

According to yet another aspect of the present disclosure, there is provided a driving method for driving a pixel circuit, wherein a first voltage terminal is provided with an input signal at low level, and a second voltage terminal is provided with an input signal at high level. In the driving method, firstly, a signal at low level is inputted at the reset terminal, a signal at high level is inputted at the first control terminal, a signal at high level is inputted at the second control terminal, and a signal at high level is inputted at the third control terminal. Then, a signal at high level is inputted at the reset terminal, a signal at low level is inputted at the first control terminal, a signal at low level is inputted at the second control terminal, and a signal at high level is inputted at the third control terminal. Then, a signal at high level is inputted at the reset terminal, a signal at low level is inputted at the first control terminal, a signal at high level is inputted at the second control terminal, and a signal at high level is inputted at the third control terminal. Subsequently, a signal at high level is inputted at the reset terminal, a signal at low level is inputted at the first control terminal, a signal at high level is inputted at the second control terminal, and a signal at low level is inputted at the third control terminal.

According to yet another aspect of the present disclosure, there is provided a driving method for driving a pixel circuit, wherein a first voltage terminal is provided with an input signal at high level, and a second voltage terminal is provided with an input signal at low level. The driving method may include inputting a signal at high level at the reset terminal, a signal at low level at the first control terminal, a signal at low level at the second control terminal, and a signal at low level at the third control terminal. The driving method may further include inputting a signal at low level at the reset terminal, a signal at high level at the first control terminal, a signal at high level at the second control terminal, and a signal at low level at the third control terminal. The driving method may further include inputting a signal at low level at the reset terminal, a signal at high level at the first control terminal, a signal at low level at the second control terminal, and a signal at low level at the third control terminal. The driving method may further include inputting a signal at low level at the reset terminal, a signal at high level at the first control terminal, a signal at low level at the second control terminal, and a signal at high level at the third control terminal.

With the pixel circuit, the driving method thereof and the detector according to the embodiments of the present disclosure, the compensation unit may compensate for the threshold voltage Vth of the amplifier unit, and thus the instability of the outputted voltage signal caused by the drift of the threshold voltage Vth can be avoided, and the image quality can be improved significantly.

BRIEF DESCRIPTION OF THE DRAWINGS

To illustrate the embodiments of the present disclosure more clearly, a brief description will be made for the accompanying drawings of embodiments below. It should be understood that the drawings described hereinafter only relate to the embodiments of the present disclosure, but in no way limit the scope of the present disclosure. In these drawings.

DETAILED DESCRIPTION

For the purpose of illustrating technical features and advantages of the embodiments of the present disclosure more apparently, the embodiments will be clearly and fully described in detail with reference to the accompanying drawings. It is obvious that, the embodiments described below are not exhaustive. Based on the embodiments of the present disclosure described below, a person skilled in the art can obtain other embodiments, which also fall into the scope of the disclosure.

First Embodiment

Figure 1:
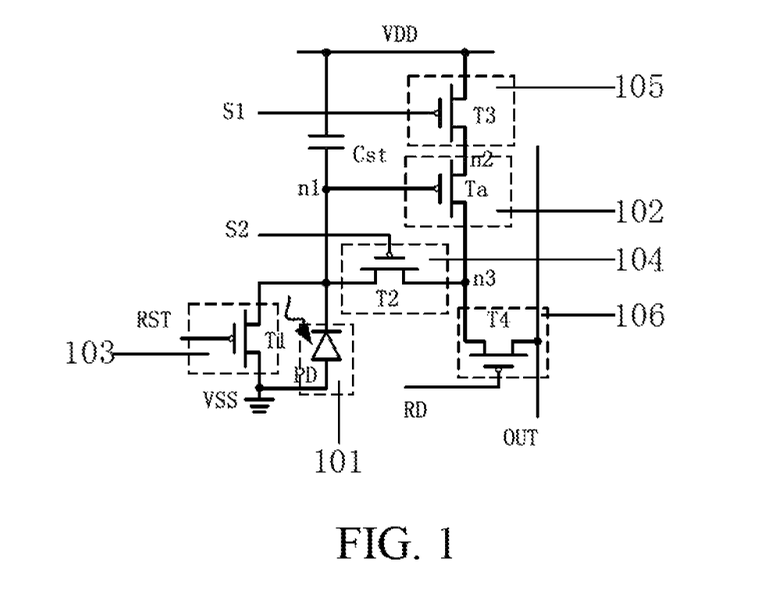
FIG. 1 is a structure diagram of the pixel circuit according to a first embodiment of the present disclosure.

FIG. 1 schematically shows a structure of the pixel circuit according to the first embodiment of the present disclosure. As shown in FIG. 1, the pixel circuit includes a photoelectric converter unit 101, an amplifier unit 102, a reset unit 103, a compensation unit 104, a charging unit 105 and a readout unit 106.

The photoelectric converter unit 101 may be connected to a first voltage terminal and a first node n1. The photoelectric converter unit 101 may convert an optical signal irradiating the pixel circuit into an electric signal. In an embodiment of the disclosure, the photoelectric converter unit 101 may include a photoelectric diode PD. The negative electrode of the photoelectric diode PD may be connected to the first node n1, and the positive electrode thereof may be connected to the first voltage terminal.

The amplifier unit 102 may be connected to the first node n1, a second node n2 and a third node n3. The amplifier unit 102 may amplify the input signal at the first node n1. In an embodiment, the input signal from the first node n1 to be amplified is the output signal of the photoelectric converter unit 101. In an embodiment of the disclosure, the amplifier unit 102 may include an amplifier transistor Ta. A gate electrode of the amplifier transistor Ta may be connected to the first node n1. A first electrode of the amplifier transistor Ta may be connected to the second node n2, A second electrode of the amplifier transistor Ta may be connected to the third node n3. The reset unit 103 may be connected to a reset terminal RST, the first voltage terminal and the first node n1. The reset unit 103 may control the voltage at the first node n1 according to an input signal from the reset terminal RST and an input signal from the first voltage terminal, so as to reset the amplifier unit 102. In an embodiment of the disclosure, the reset unit 103 may include a first transistor T1. A gate electrode of the first transistor T1 may be connected to the reset terminal RST. A first electrode of the first transistor T1 may be connected to the first node n1. A second electrode of the first transistor T1 may be connected to the first voltage terminal.

The charging unit 105 may be connected to a first control terminal S1, the second node n2 and a second voltage terminal. The charging unit 105 may control the voltage at the second node n2 according to an input signal from the first control terminal S1 and an input signal from the second voltage terminal. In an embodiment of the disclosure, the charging unit 105 may include a third transistor T3. A gate electrode of the third transistor T3 may be connected to the first control terminal S1. A first electrode of the third transistor T3 may be connected to the second voltage terminal. A second electrode of the third transistor T3 may be connected to the second node n2.

The compensation unit 104 may be connected to a second control terminal S2, the first node n1 and the third node n3. The compensation unit 104 may control the voltage at the third node n3 according to an input signal from the second control terminal S2. In an embodiment of the disclosure, the compensation unit 104 may comprise a second transistor T2. A gate electrode of the second transistor T2 may be connected to the second control terminal S2. A first electrode of the second transistor T2 may be connected to the first node n1. A second electrode of the second transistor T2 may be connected to the third node n3.

The readout unit 106 may be connected to a third control terminal RD and the third node n3. The readout unit 106 may control an output signal OUT according to an input signal from the third control terminal RD. In an embodiment of the disclosure, the readout unit 106 may comprise a fourth transistor T4. A gate electrode of the fourth transistor T4 may be connected to the third control terminal RD. A first electrode of the fourth transistor T4 may be connected to the third node n3. A second electrode of the fourth transistor T4 may serve as an output terminal to output the final output signal OUT.

Further, the pixel circuit may include a first capacitor Cst. The first capacitor Cst may be connected between the second voltage terminal and the first node n1.

In this embodiment, all of the amplifier transistor, the first, second, third and fourth transistors are P-type transistors. In this case, an input signal at low level VSS is provided to the first voltage terminal, and an input signal at high level VDD is provided to the second voltage terminal.

It should be noted that, in various embodiments of the present disclosure, the first node n1, the second node n2 and the third node n3 are merely defined for illustration, and do not indicate any real node. In the embodiment as shown in FIG. 1, the photoelectric converter unit 101, the amplifier unit 102, the reset unit 103 and the compensation unit 104 are connected at the first node n1. The amplifier unit 102 and the charging unit 105 are connected at the second node n2. The amplifier unit 102, the compensation unit 104 and the readout unit 106 are connected at the third node n3.

In the pixel circuit according to the first embodiment of the present disclosure, the compensation unit 104 can compensate for the threshold voltage Vth of the amplifier unit 102, to eliminate the influence on the outputted voltage signal caused by the drift of the threshold voltage Vth, and thus the image quality can be improved significantly.

Second Embodiment

Figure 2:
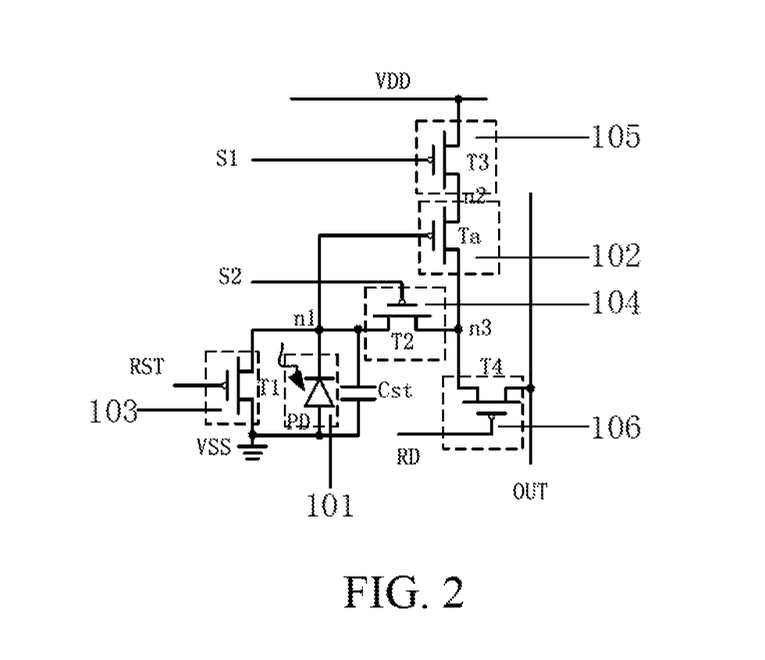
FIG. 2 is a structure diagram of the pixel circuit according to a second embodiment of the present disclosure.

FIG. 2 is a structure diagram of the pixel circuit according to the second embodiment of the present disclosure. As shown in FIG. 2, the pixel circuit may include the photoelectric converter unit 101, the amplifier unit 102, the reset unit 103, the compensation unit 104, the charging unit 105 and the readout unit 106.

The photoelectric converter unit 101 may be connected to the first voltage terminal and the first node n1. The photoelectric converter unit 101 may convert the optical signal irradiating the pixel circuit into the electric signal.

The amplifier unit 102 may be connected to the first node n1, the second node n2 and the third node n3. The amplifier unit 102 may amplify the input signal at the first node n1. In an embodiment, the input signal at the first node n1 to be amplified is the output signal of the photoelectric converter unit 101.

The reset unit 103 may be connected to the reset terminal RST, the first voltage terminal and the first node n1. The reset unit 103 may control the voltage at the first node n1 according to an input signal from the reset terminal RST and an input signal from the first voltage terminal.

The compensation unit 104 may be connected to the second control terminal S2, the first node n1 and the third node n3. The compensation unit 104 may control the voltage at the third node n3 according to an input signal from the second control terminal S2.

The charging unit 105 may be connected to the first control terminal S1, the second node n2 and the second voltage terminal. The charging unit 105 may control the voltage at the second node n2 according to an input signal from the first control terminal S1 and an input signal from the second voltage terminal.

The readout unit 106 may be connected to the third control terminal RD and the third node n3. The readout unit 106 may control the output signal OUT according to an input signal from the third control terminal RD.

Further, the pixel circuit may include the first capacitor Cst. Unlike the first embodiment, in the second embodiment, the first capacitor Cst may be connected between the first voltage terminal and the first node n1.

Furthermore, in an embodiment of the present disclosure, the pixel circuit may include both a first capacitor and a second capacitor. In an embodiment, the first capacitor may be connected between the second voltage terminal and the first node n1, and the second capacitor may be connected between the first voltage terminal and the first node n1. Those skilled in the art will appreciate that the first or second capacitor may be a parasitic capacitor of the photoelectric diode PD or other parasitic capacitor connected to the first node n1, and thus may not be produced separately.

In this embodiment, all of the amplifier transistor, the first, second, third and fourth transistors are P-type transistors. Therefore, the input signal at low level VSS is provided to the first voltage terminal, and the input signal at high level VDD is provided to the second voltage terminal.

In the pixel circuit according to the second embodiment of the present disclosure, the compensation unit 104 can compensate for the threshold voltage Vth of the amplifier unit 102, to eliminate the influence on the outputted voltage signal caused by the drift of the threshold voltage Vth, and thus the image quality can be improved significantly.

Third Embodiment

Figure 3:
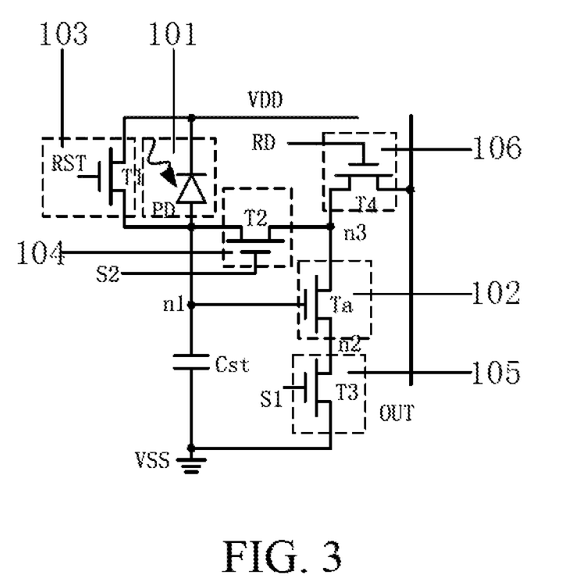
FIG. 3 is a structure diagram of the pixel circuit according to a third embodiment of the present disclosure.

FIG. 3 is a structure diagram of the pixel circuit according to the third embodiment of the present disclosure. As shown in FIG. 3, the pixel circuit includes the photoelectric converter unit 101, the amplifier unit 102, the reset unit 103, the compensation unit 104, the charging unit 105 and the readout unit 106.

The photoelectric converter unit 101 may be connected to the first voltage terminal and the first node n1. The photoelectric converter unit 101 may convert the optical signal irradiating the pixel circuit into the electric signal. In an embodiment of the disclosure, the photoelectric converting unit 101 may include the photoelectric diode PD. The positive electrode of the photoelectric diode PD may be connected to the first node n1, and the negative electrode thereof may be connected to the first voltage terminal.

The amplifier unit 102 may be connected to the first node n1, the second node n2 and the third node n3. The amplifier unit 102 may amplify the input signal at the first node n1. In an embodiment of the disclosure, the amplifier unit 102 may include the amplifier transistor Ta. The gate electrode of the amplifying transistor Ta may be connected to the first node n1. The first electrode of the amplifier transistor Ta may be connected to the second node n2. The second electrode of the amplifier transistor Ta may be connected to the third node n3.

The reset unit 103 may be connected to the reset terminal RST, the first voltage terminal and the first node n1. The reset unit 103 may control the voltage at the first node n1 according to an input signal from the reset terminal RST and an input signal from the first voltage terminal, so as to reset the amplifier unit 102. In an embodiment of the disclosure, the reset unit 103 may include the first transistor T1. The gate electrode of the first transistor T1 may be connected to the reset terminal RST. The first electrode of the first transistor T1 may be connected to the first node n1. The second electrode of the first transistor T1 may be connected to the first voltage terminal.

The charging unit 105 may be connected to the first control terminal S1, the second node n2 and the second voltage terminal. The charging unit 105 may control the voltage at the second node n2 according to an input signal from the first control terminal S1 and an input signal from the second voltage terminal. In an embodiment of the disclosure, the charging unit 105 may include the third transistor T3. The gate electrode of the third transistor T3 may be connected to the first control terminal S1. The first electrode of the third transistor T3 may be connected to the second voltage terminal. The second electrode of the third transistor T3 may be connected to the second node n2.

The compensation unit 104 may be connected to the second control terminal S2, the first node n1 and the third node n3. The compensation unit 104 may control the voltage at the third node n3 according to an input signal from the second control terminal S2. In an embodiment of the disclosure, the compensation unit 104 may include the second transistor T2. The gate electrode of the second transistor T2 may be connected to the second control terminal S2. The first electrode of the second transistor T2 may be connected to the first node n1. The second electrode of the second transistor T2 may be connected to the third node n3.

The readout unit 106 may be connected to the third control terminal RD and the third node n3. The readout unit 106 may control the output signal OUT according to an input signal from the third control terminal RD. In an embodiment of the disclosure, the readout unit 106 may include the fourth transistor T4. The gate electrode of the fourth transistor T4 may be connected to the third control terminal RD. The first electrode of the fourth transistor T4 may be connected to the third node n3. The second electrode of the fourth transistor T4 may serve as the output terminal to output the signal OUT.

Further the pixel circuit may include the first capacitor Cst. The first capacitor Cst may be connected between the second voltage terminal and the first node n1.

In this embodiment, all of the amplifier transistor, the first, second, third and fourth transistors are N-type transistors. In this case, the input signal at high level VDD is provided to the first voltage terminal, and the input signal at low level VSS is provided to the second voltage terminal.

In the pixel circuit according to the third embodiment of the present disclosure, the compensation unit 104 can compensate for the threshold voltage Vth of the amplifier unit 102, to eliminate the influence on the outputted voltage signal caused by the drift of the threshold voltage Vth, and thus the image quality can be improved significantly.

Fourth Embodiment

Figure 4:
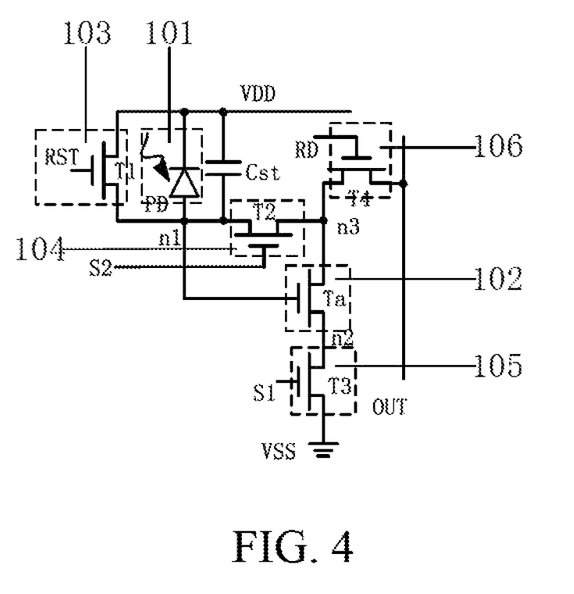
FIG. 4 is a structure diagram of the pixel circuit according to a fourth embodiment of the present disclosure.

FIG. 4 is a structure diagram of the pixel circuit according to the fourth embodiment of the present disclosure. As shown in FIG. 4, the pixel circuit includes the photoelectric converter unit 101, the amplifier unit 102, the reset unit 103, the compensation unit 104, the charging unit 105 and the readout unit 106.

The photoelectric converter unit 101 may be connected to the first voltage terminal and the first node n1. The photoelectric converter unit 101 may convert the optical signal irradiating the pixel circuit into the electric signal.

The amplifier unit 102 may be connected to the first node n1, the second node n2 and the third node n3. The amplifier unit 102 may amplify the input signal at the first node n1.

The reset unit 103 may be connected to the reset terminal RST, the first voltage terminal and the first node n1. The reset unit 103 may control the voltage at the first node n1 according to an input signal from the reset terminal RST and an input signal from the first voltage terminal.

The compensation unit 104 may be connected to the second control terminal S2, the first node n1 and the third node n3. The compensation unit 104 may control the voltage at the third node n3 according to an input signal from the second control terminal S2.

The charging unit 105 may be connected to the first control terminal S1, the second node n2 and the second voltage terminal. The charging unit 105 may control the voltage at the second node n2 according to an input signal from the first control terminal S1 and an input signal from the second voltage terminal.

The readout unit 106 may be connected to the third control terminal RD and the third node n3. The readout unit 106 may control the output signal OUT according to an input signal from the third control terminal RD.

Further, the pixel circuit may comprise the first capacitor Cst. Unlike the Third embodiment, the first capacitor Cst may be connected between the first voltage terminal and the first node n1.

Furthermore, in an embodiment of the present disclosure, the pixel circuit may include both the first capacitor and the second capacitor. In an embodiment, the first capacitor may be connected between the second voltage terminal and the first node n1, and the second capacitor may be connected between the first voltage terminal and the first node n1. Those skilled in the art will appreciate that the first or second capacitor may be a parasitic capacitor of the photoelectric diode PD or other parasitic capacitor connected to the first node n1, and thus may not be produced separately.

In this embodiment, all of the amplifier transistor, the first, second, third and fourth transistors are N-type transistors. Therefore, the input signal at high level VDD is provided to the first voltage terminal, and the input signal at low level VSS is provided to the second voltage terminal.

In the pixel circuit according to the second embodiment of the present disclosure, the compensation unit 104 can compensate for the threshold voltage Vth of the amplifier unit 102, to eliminate the influence on the outputted voltage signal caused by the drift of the threshold voltage Vth, and thus the image quality can be improved significantly.

Fifth Embodiment

This embodiment provides a detector which may include the pixel circuit as described in the first embodiment, the second embodiment, the third embodiment or the fourth embodiment. The pixel circuit has been described in detail in the above first, second, third and fourth embodiments, and thus the description thereof is omitted herein.

In the detector according to the embodiment, the compensation unit of the pixel circuit can compensate for the threshold voltage Vth of the amplifier unit, and accordingly the detector can avoid instability of the outputted voltage signal caused by the drift of the threshold voltage Vth, and the image quality can be improved significantly.

Sixth Embodiment

Figure 5:
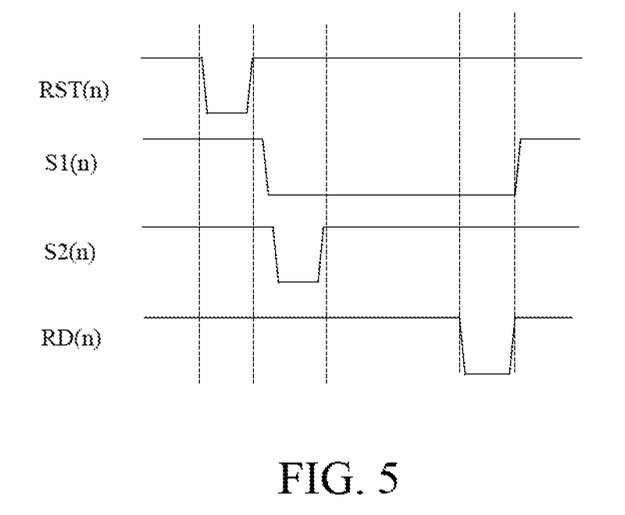
FIG. 5 is a timing sequence diagram of the pixel circuit with P-type transistors according to the embodiments of the present disclosure.

This embodiment provides a driving method for driving a pixel circuit including the pixel circuit as described in the first or second embodiment. In such the pixel circuit, all the transistors are P-type transistors. Therefore, the input signal at low level VSS is provided to the first voltage terminal, and the input signal at high level VDD is provided to the second voltage terminal. The driving method of the present embodiment will be described as below with reference to the pixel circuit as shown in FIG. 1. FIG. 5 shows the timing sequence diagram of the pixel circuit as shown in FIG. 1.

At step 1001, the signal at low level is inputted to the reset terminal, the signal at high level is inputted to the first control terminal, the signal at high level is inputted to the second control terminal, and the signal at high level is inputted to the third control terminal. This step may be considered as a reset phase.

Referring to FIG. 5, during the reset phase, the reset terminal RST receives the signal at low level, and thus the first transistor T1 is ON. As the signal at high level is inputted to the first control terminal S1, the third transistor T3 is OFF. As the signal at high level is inputted to the second control terminal S2, the second transistor T2 is OFF. As the signal at high level is inputted to the third control terminal RD, the fourth transistor T4 is OFF. In this case, the voltage at the first node n1 is reset to the low voltage VSS, i.e. the voltage at the first node n1 Vn1=VSS. This voltage will be stored on the first capacitor Cst.

At step 1002, the signal at high level is inputted to the reset terminal, the signal at low level is inputted to the first control terminal, the signal at low level is inputted to the second control terminal, and the signal at high level is inputted to the third control terminal. This step may be considered as a compensation phase.

Referring to FIG. 5, during the compensation phase, the signal at high level is inputted to the reset terminal RST, and thus the first transistor T1 becomes OFF. The signal at low level is inputted to the first control terminal S1, and thus the third transistor T3 becomes ON. The signal at low level is inputted to the second control terminal S2, and thus the second transistor T2 also becomes ON. The third control terminal RD continues to receive the signal at high level, and the fourth transistor T4 is still OFF. In this case, the amplifier transistor Ta enters into diode connection state, and the voltage at the first node n1 is Vn1=Vn3=VDD−|Vth|, where Vn3 is the voltage at the third node n3, and Vth is the threshold voltage of the amplifier transistor Ta.

At step 1003, the signal at high level is inputted to the reset terminal, the signal at low level is inputted to the first control terminal, the signal at high level is inputted to the second control terminal, and the signal at high level is inputted to a third control terminal. This step may be considered as a charging phase.

During the charging phase, the reset terminal RST continues to receive the signal at high level and the first transistor T1 is still OFF. The first control terminal S1 continues to receive the signal at low level and the third transistor T3 is still ON. The signal at high level is inputted to the second control terminal S2, and thus the second transistor T2 becomes OFF. The third control terminal RD continues to receive the signal at high level, and the fourth transistor T4 is still OFF. In this case, only the photoelectric diode PD provides the current flowing through the first node n1, and therefore the magnitude of the current flowing through the first node n1 is associated with illumination intensity of the pixel circuit. Assume that the average value of the current flowing through the first node n1 is expressed as I, the voltage at the first node n1 after a certain amount of time t has elapsed is reduced by $$\frac{It}{Cst},$$

and the voltage at the first node n1 is $$Vn1 = VDD - |Vth| - \frac{It}{Cst}.$$

At step 1004, the signal at high level is inputted to the reset terminal, the signal at low level is inputted to the first control terminal, the signal at high level is inputted to the second control terminal, and the signal at low level is inputted to the third control terminal. This step may be considered as a readout phase.

During the readout phase, the reset terminal RST continues to receive the signal at high level and the first transistor T1 is still OFF. The first control terminal S1 continues to receive the signal at low level and the third transistor T3 is still ON. The second control terminal S2 continues to receive the signal at high level and the second transistor T2 is still OFF. The signal at low level is inputted to the third control terminal RD, and thus the fourth transistor T4 becomes ON. In this case, the amplifier transistor Ta is in a saturation region, and the current of the amplifier transistor Ta may be calculated as:

$$Id = \frac{1}{2}\mu_n \cdot Cox \cdot \frac{W}{L} \cdot (VDD - Vn1 - |Vth|)^2,$$

where $\mu_n$ represents a carrier mobility, Cox represents a capacitance value of gate insulating layer per unit area, and W/L represents a width to length ratio of the amplifier transistor Ta.

As $$Vn1 = VDD - |Vth| - \frac{It}{Cst},$$

the current of the amplifier transistor Ta may be calculated as:

$$Id = \frac{1}{2}\mu_n \cdot Cox \cdot \frac{W}{L} \cdot \left(\frac{It}{Cst}\right)^2$$

In this way, upon reading out the current Id, the magnitude of the variable I can be analyzed, and the information about the illumination intensity of the pixel circuit can be obtained.

With the driving method according to the sixth embodiment, the compensation unit can compensate for the threshold voltage Vth of the amplifier unit, and accordingly the instability of the outputted voltage signal caused by the drift of the threshold voltage Vth can be avoided, and the image quality can be improved significantly.

Seventh Embodiment

Figure 6:
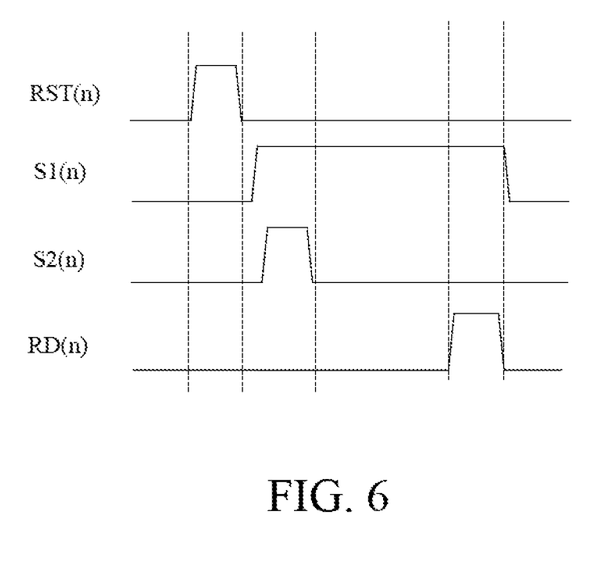
FIG. 6 is a timing sequence diagram of the pixel circuit with N-type transistors according to the embodiments of the present disclosure.

This embodiment provides a driving method for driving a pixel circuit including the pixel circuit as described in the third or fourth embodiment. In such the pixel circuit, all the transistors are N-type transistors. Therefore, the input signal at high level VDD is provided to the first voltage terminal, and the input signal at low level VSS is provided to the second voltage terminal. The driving method of the present embodiment will be described as below with reference to the pixel circuit as shown in FIG. 3. FIG. 6 shows the timing sequence diagram of the pixel circuit as shown in FIG. 3.

At step 2001, the signal at high level is inputted to the reset terminal, the signal at low level is inputted to the first control terminal, the signal at low level is inputted to the second control terminal, and the signal at low level is inputted to the third control terminal. This step may be considered as a reset phase.

Referring to FIG. 6, during the reset phase, the reset terminal RST receives the signal at high level, and thus the first transistor T1 is ON. As the signal at low level is inputted to the first control terminal S1, the third transistor T3 is OFF. As the signal at low level is inputted to the second control terminal S2, the second transistor T2 is OFF. As the signal at low level is inputted to the third control terminal RD, the fourth transistor T4 is OFF. In this case, the voltage at the first node n1 is reset to the high voltage VDD, i.e. the voltage at the first node n1 Vn1=VDD. This voltage will be stored on the first capacitor Cst.

At step 2002, the signal at low level is inputted to the reset terminal, the signal at high level is inputted to the first control terminal, the signal at high level is inputted to the second control terminal, and the signal at low level is inputted to the third control terminal. This step may be considered as a compensation phase.

During the compensation phase, the signal at low level is inputted to the reset terminal RST, and thus the first transistor T1 becomes OFF. The signal at high level is inputted to the first control terminal S1, and thus the third transistor T3 becomes ON. The signal at high level is inputted to the second control terminal S2, and thus the second transistor T2 also becomes ON. The third control terminal RD continues to receive the signal at low level, and the fourth transistor T4 is still OFF. In this case, the amplifier transistor Ta enters into diode connection state, and the voltage at the first node n1 is Vn1=Vn3=VSS+Vth, where Vn3 is the voltage at the third node n3, and Vth is the threshold voltage of the amplifier transistor Ta.

At step 2003, the signal at low level is inputted to the reset terminal, the signal at high level is inputted to the first control terminal, the signal at low level is inputted to the second control terminal, and the signal at low level is inputted to a third control terminal. This step may be considered as a charging phase.

During the charging phase, the reset terminal RST continues to receive the signal at low level and the first transistor T1 is still OFF. The first control terminal S1 continues to receive the signal at high level and the third transistor T3 is still ON. The signal at low level is inputted to the second control terminal S2, and thus the second transistor T2 becomes OFF. The third control terminal RD continues to receive the signal at low level, and the fourth transistor T4 is still OFF. In this case, only the photoelectric diode PD provides the current flowing through the first node n1, and therefore the magnitude of the current flowing through the first node n1 is associated with illumination intensity of the pixel circuit. Assume that the average value of the current flowing through the first node n1 is expressed as I, the voltage at the first node n1 after a certain amount of time t has elapsed is increased by $$\frac{It}{Cst},$$

and the voltage at the first node n1 is $$Vn1 = VSS + Vth + \frac{It}{Cst}.$$

At step 2004, the signal at low level is inputted to the reset terminal, the signal at high level is inputted to the first control terminal, the signal at low level is inputted to the second control terminal, and the signal at high level is inputted to the third control terminal. This step may be considered as a readout phase.

During the readout phase, the reset terminal RST continues to receive the signal at low level and the first transistor T1 is still OFF. The first control terminal S1 continues to receive the signal at high level and the third transistor T3 is still ON. The second control terminal S2 continues to receive the signal at low level and the second transistor T2 is still OFF. The signal at high level is inputted to the third control terminal RD, and thus the fourth transistor T4 becomes ON. In this case, the amplifier transistor Ta is in a saturation region, and the current of the amplifier transistor Ta may be calculated as:

$$Id = \frac{1}{2}\mu_n \cdot Cox \cdot \frac{W}{L} \cdot (Vn1 - VSS - Vth)^2,$$

where $\mu_n$ represents a carrier mobility, Cox represents a capacitance value of gate insulating layer per unit area, and W/L represents a width to length ratio of the amplifier transistor Ta.

As $$Vn1 = VSS + Vth + \frac{It}{Cst},$$

the current of the amplifier transistor Ta may be calculated as:

$$Id = \frac{1}{2}\mu_n \cdot Cox \cdot \frac{W}{L} \cdot \left(\frac{It}{Cst}\right)^2.$$

In this way, upon reading out the current Id, the magnitude of the variable I can be analyzed, and the information about the illumination intensity of the pixel circuit can be obtained.

With the driving method according to the sixth embodiment, the compensation unit can compensate for the threshold voltage Vth of the amplifier unit, and accordingly the instability of the outputted voltage signal caused by the drift of the threshold voltage Vth can be avoided, and the image quality can be improved significantly.

Although several embodiments of the present disclosure have been described in detail above, the scope of the present disclosure is not limited thereto. Obviously, a person skilled in the art may make various modifications and variations to the above embodiments, without departing from the scope and spirit of the present disclosure. The scope of the present disclosure is defined by the appended claims.

What is claimed is:

1. A pixel circuit comprising a photoelectric converter unit, an amplifier unit, a reset unit, a compensation unit, a charging unit, and a readout unit,
wherein the photoelectric converter unit is connected to a first voltage terminal and the amplifier unit, and is configured to convert an optical signal into an electric signal,
wherein the amplifier unit is connected to the photoelectric converter unit, the charging unit, and the readout unit, and is configured to amplify an output signal from the photoelectric converter unit,
wherein the reset unit is connected to a reset terminal, the first voltage terminal, and the amplifier unit, and is configured to reset the amplifier unit based on an input signal from the reset terminal and an input signal from the first voltage terminal,
wherein the charging unit is connected to a first control terminal, a second voltage terminal, and the amplifier unit, and is configured to control a voltage at an end of the amplifier unit based on an input signal from the first control terminal and an input signal from the second voltage terminal,
wherein the compensation unit is connected to a second control terminal, the reset unit, and the amplifier unit, and is configured to control a voltage at another end of the amplifier unit based on an input signal from the second control terminal, and
wherein the readout unit is connected to a third control terminal and the amplifier unit, and is configured to control an output signal based on an input signal from the third control terminal.

2. The pixel circuit according to claim 1 wherein the photoelectric converter unit comprises a photoelectric diode which is connected between the amplifier unit and the first voltage terminal.

3. The pixel circuit according to claim 1 wherein the amplifier unit comprises an amplifier transistor, wherein a gate electrode of the amplifier transistor is connected to the photoelectric converter unit, a first electrode of the amplifier transistor is connected to the charging unit, and a second electrode of the amplifier transistor is connected to the readout unit.

4. The pixel circuit according to claim 3 wherein the reset unit comprises a first transistor, wherein a gate electrode of the first transistor is connected to the reset terminal, a first electrode of the first transistor is connected to the amplifier unit, and a second electrode of the first transistor is connected to the first voltage terminal.

5. The pixel circuit according to claim 4 wherein the charging unit comprises a third transistor, wherein a gate electrode of the third transistor is connected to the first control terminal, a first electrode of the third transistor is connected to the second voltage terminal, and a second electrode of the third transistor is connected to the amplifier unit.

6. The pixel circuit according to claim 5 wherein the compensation unit comprises a second transistor, wherein a gate electrode of the second transistor is connected to the second control terminal, a first electrode of the second transistor is connected to the reset unit, and a second electrode of the second transistor is connected to the amplifier unit.

7. The pixel circuit according to claim 6 wherein the readout unit comprises a fourth transistor, wherein a gate electrode of the fourth transistor is connected to the third control terminal, a first electrode of the fourth transistor is connected to the amplifier unit, and a second electrode of the fourth transistor outputs the output signal.

8. The pixel circuit according to claim 1 further comprising a first capacitor, wherein the first capacitor is one of i) connected between the second voltage terminal and an input of the amplifier unit and ii) connected between the first voltage terminal and the input of the amplifier unit.

9. The pixel circuit according to claim 1 further comprising a first capacitor and a second capacitor, wherein the first capacitor is connected between the second voltage terminal and an input of the amplifier unit, and the second capacitor is connected between the first voltage terminal and the input of the amplifier unit.

10. The pixel circuit according to claim 7 wherein the transistors are P-type transistors.

11. The pixel circuit according to claim 7 wherein the transistors are N-type transistors.

12. A detector comprising a pixel circuit according to claim 1.

13. A driving method for driving a pixel circuit, wherein the pixel circuit comprises a pixel circuit according to claim 10, a first voltage terminal is provided with an input signal at low level, and a second voltage terminal is provided with an input signal at high level, the driving method comprising:
inputting a signal at low level at the reset terminal, a signal at high level at the first control terminal, a signal at high level at the second control terminal, and a signal at high level at the third control terminal,
inputting a signal at high level at the reset terminal, a signal at low level at the first control terminal, a signal at low level at the second control terminal, and a signal at high level at the third control terminal,
inputting a signal at high level at the reset terminal, a signal at low level at the first control terminal, a signal at high level at the second control terminal, and a signal at high level at the third control terminal, and
inputting a signal at high level at the reset terminal, a signal at low level at the first control terminal, a signal at high level at the second control terminal, and a signal at low level at the third control terminal.

14. A driving method for driving a pixel circuit, wherein the pixel circuit comprises a pixel circuit according to claim 11, a first voltage terminal is provided with an input signal at high level, and a second voltage terminal is provided with an input signal at low level, the driving method comprising:
inputting a signal at high level at the reset terminal, a signal at low level at the first control terminal, a signal at low level at the second control terminal, and a signal at low level at the third control terminal,
inputting a signal at low level at the reset terminal, a signal at high level at the first control terminal, a signal at high level at the second control terminal, and a signal at low level at the third control terminal,
inputting a signal at low level at the reset terminal, a signal at high level at the first control terminal, a signal at low level at the second control terminal, and a signal at low level at the third control terminal, and
inputting a signal at low level at the reset terminal, a signal at high level at the first control terminal, a signal at low level at the second control terminal, and a signal at high level at the third control terminal.

15. The pixel circuit according to claim 2 wherein the amplifier unit comprises an amplifier transistor, wherein a gate electrode of the amplifier transistor is connected to the photoelectric converter unit, a first electrode of the amplifier transistor is connected to the charging unit, and a second electrode of the amplifier transistor is connected to the readout unit.

16. The pixel circuit according to claim 1 wherein the reset unit comprises a first transistor, wherein a gate electrode of the first transistor is connected to the reset terminal, a first electrode of the first transistor is connected to the amplifier unit, and a second electrode of the first transistor is connected to the first voltage terminal.

17. The pixel circuit according to claim 1 wherein the charging unit comprises a third transistor, wherein a gate electrode of the third transistor is connected to the first control terminal, a first electrode of the third transistor is connected to the second voltage terminal, and a second electrode of the third transistor is connected to the amplifier unit.

18. The pixel circuit according to claim 1 wherein the compensation unit comprises a second transistor, wherein a gate electrode of the second transistor is connected to the second control terminal, a first electrode of the second transistor is connected to the reset unit, and a second electrode of the second transistor is connected to the amplifier unit.

19. The pixel circuit according to claim 1 wherein the readout unit comprises a fourth transistor, wherein a gate electrode of the fourth transistor is connected to the third control terminal, a first electrode of the fourth transistor is connected to the amplifier unit, and a second electrode of the fourth transistor outputs the output signal.

20. The pixel circuit according to claim 7 further comprising a first capacitor, wherein the first capacitor is connected between the second voltage terminal and an input of the amplifier unit, or wherein the first capacitor is connected between the first voltage terminal and an input of the amplifier unit.

* * * * *